E. A. LAUGHLIN.
CENTER BEARING.
APPLICATION FILED MAY 20, 1912.
1,112,012.
Patented Sept. 29, 1914.
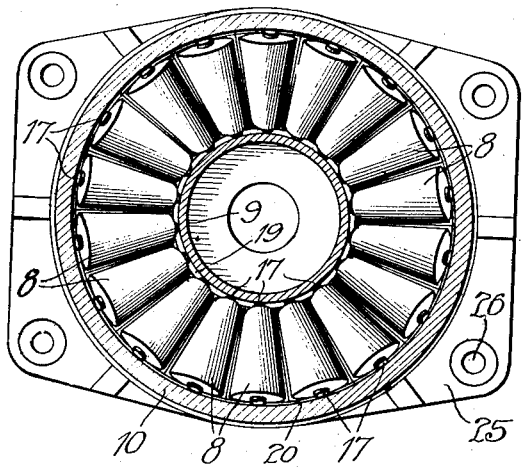
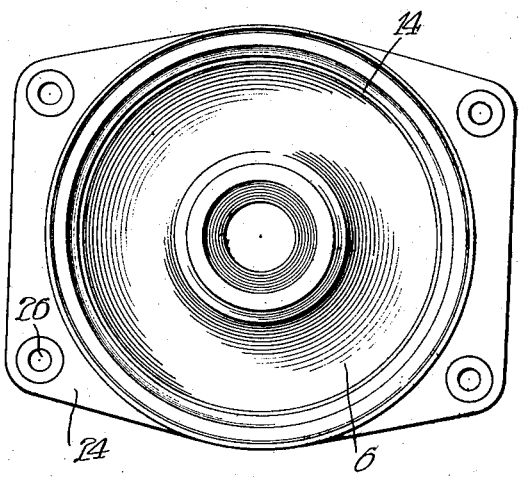
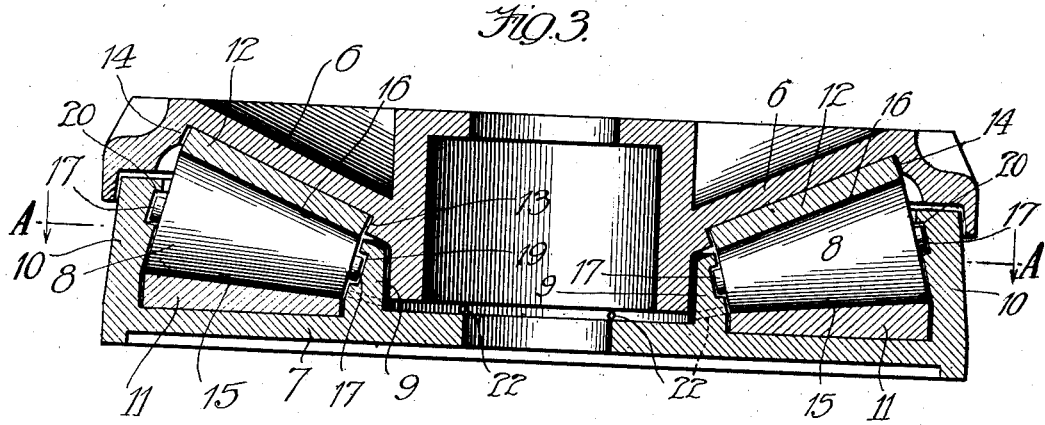
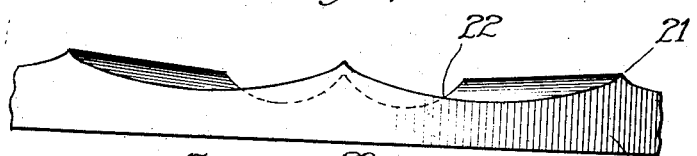

UNITED STATES PATENT OFFICE.

ELMYR A. LAUGHLIN, OF CHICAGO, ILLINOIS.

CENTER-BEARING.

1,112,012.

Specification of Letters Patent. Patented Sept. 29, 1914.

Application filed May 20, 1912. Serial No. 698,593.

*To all whom it may concern:*

Be it known that I, ELMYR A. LAUGHLIN, a citizen of the United States of America, and a resident of Chicago, county of Cook, State of Illinois, have invented certain new and useful Improvements in Center-Bearings, of which the following is a specification.

The main objects of this invention are to provide an improved form of center bearing for cars, in which the roller bearings will be normally urged into operative contact with the bearing surfaces; to provide an improved construction of the wear plates in a bearing of this kind whereby the thrust on the roller bearings will tend to normally urge said roller bearings inwardly toward the axis of said bearing; to provide improved means for insuring the proper relative radial disposition of said roller bearings; and to provide improved means for permitting the escape of dirt from the wear surfaces of the bearing.

An illustrative embodiment of this invention is shown in the accompanying drawing, in which:

Figure 1 is a plan view of a bearing constructed according to this invention, the upper housing member being removed and the lower member being in section on the line A—A of Fig. 3. Fig. 2 is a bottom plan view of the upper housing member. Fig. 3 is an enlarged sectional elevation of the complete assembled bearing. Fig. 4 is an enlarged fragmentary detail of the lower wear plate. Fig. 5 is a fragmentary view of the lower housing member showing the arrangement of the notches in the annular flanges which permit the insertion or withdrawal of the rollers.

In the construction shown in the drawing the upper and lower housing members 6 and 7 are arranged to have relative rotation, being spaced and supported apart by the conical anti-friction rollers 8. The lower housing member 7 has integrally formed thereon the upwardly disposed annular flanges 9 and 10 concentrically arranged with respect to the axis of the bearing, which form a runway for rollers. An annular wear plate 11 is supported on the lower housing member 7 between the flanges 9 and 10, and an annular wear plate 12 is secured to the upper housing member between the annular shoulders 13 and 14.

The lower wear plate 11 which is preferably in the form of a ring, has the bearing surface 15 thereof inclined downwardly, from the horizontal, toward the center of the bearing. The wear plate 12 which is herein shown to be a conical ring, has its bearing surface 16 also inclined downwardly, with respect to the horizontal, toward the center of the bearing. The conical rollers 8 are of the usual construction, and are provided with cylindrical studs 17 at the opposite ends thereof, which are received in the annular slots or grooves 19 and 20 formed in the respective shoulders 9 and 10. These studs coact with the grooves to prevent accidental dislodgment of the rollers.

By virtue of the similar downward inclination of both of the bearing surfaces 15 and 16 of the wear plates 11 and 12, the tendency of the bearing surface 16 to urge the rollers 8 radially outward from the center of the bearing is offset by the tendency of the bearing surface 15 to urge the rollers radially inward. If any of the rollers 8 are not in contact with the bearing surface 16 of the wear plate 12 the jar or vibration of the bearing will tend to cause them to shift inwardly toward the center of the bearing, by reason of the inclination of the bearing surface 15. Therefore, in the present construction the rollers 8 are always to end-shift toward the center of the bearing so as to enter into and remain in contact with both of the bearing surfaces of the wear plates 11 and 12, whereas in prior constructions the relative inclination of the bearing surfaces of the wear plates tends to cause the rollers to shift outwardly from the center of the bearing and therefore frequently gives rise to conditions which cause all of the weight and wear to be borne by a small number of the rollers. The upper surface of the wear plate is radially fluted or scalloped to provide an annular series of alternating ridges 21 and depressions 21ᵃ, which cause the rollers to return to certain definite positions.

A plurality of apertures 22 extend through the flange 9 adjacent to the bearing surface 15 of the wear plate 11. These apertures permit an escape of dirt or grindings from the roller runways which might otherwise accumulate and interfere with the proper working of the bearing. The flanges 9 and 10 are provided with one or more sets of notches 23 (Fig. 5) which communicate with the slots 19 and 20 for receiving the studs 17 when the rollers 8 are to be placed in or removed from the runway formed between the flanges 9 and 10.

The housing members 6 and 7 are provided with the respective flanges 24 and 25 which have the apertures 26 by which the members are respectively secured to the car bolster and truck bolster. The usual "king pin" connection (not shown) secures the housing members 6 and 7 in their assembled positions.

Although but one specific embodiment of this invention has been herein shown and described, it will be understood that numerous details of the construction shown may be altered or omitted without departing from the spirit of this invention as defined by the following claims, the term conical being intended to mean a surface of the general character of a cone and having converging straight line elements.

I claim:—

A center bearing, comprising upper and lower housing members, upwardly disposed annular flanges concentrically arranged on said lower housing member, annular grooves in said flanges, said lower housing member being provided with a wear plate having a fluted upper bearing surface, said surface being radially straight from and downwardly convergent toward the center thereof, said upper housing member being provided with a wear plate having a lower bearing surface, said surface being radially straight from and downwardly convergent toward the center thereof, and bearing rollers having studs thereon for coacting with said annular grooves, said rollers being arranged to coact with said surfaces and being free to independently adjust themselves to support said upper housing member.

Signed at Chicago this 10th day of May, 1912.

ELMYR A. LAUGHLIN.

Witnesses:
CHARLES F. HUNTOON,
O. M. HALL.